(12) United States Patent
Kshirsagar et al.

(10) Patent No.: US 10,305,764 B1
(45) Date of Patent: May 28, 2019

(54) METHODS, SYSTEMS, AND COMPUTER READABLE MEDIUMS FOR MONITORING AND MANAGING A COMPUTING SYSTEM USING RESOURCE CHAINS

(71) Applicant: VCE Company, LLC, Richardson, TX (US)

(72) Inventors: Mohit Suresh Kshirsagar, Santa Clara, CA (US); Rahul Talekar, San Jose, CA (US); Boyu Wang, Milpitas, CA (US); Akshaya Mahapatra, San Jose, CA (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 239 days.

(21) Appl. No.: 14/984,692

(22) Filed: Dec. 30, 2015

(51) Int. Cl.
*H04L 12/26* (2006.01)
*H04L 12/911* (2013.01)

(52) U.S. Cl.
CPC .............. *H04L 43/08* (2013.01); *H04L 43/50* (2013.01); *H04L 47/822* (2013.01)

(58) Field of Classification Search
CPC ................. H04L 41/0806; H04L 41/12; H04L 29/08648; H04L 29/08981; H04L 29/06; H04L 29/08072; H04L 29/08135
USPC ......................................................... 709/220
See application file for complete search history.

(56) References Cited

U.S. PATENT DOCUMENTS

| | | | | |
|---|---|---|---|---|
| 2008/0250284 | A1* | 10/2008 | Guo | G01R 31/318525 714/726 |
| 2009/0006527 | A1* | 1/2009 | Gingell, Jr. | G06F 9/5072 709/202 |
| 2009/0177936 | A1* | 7/2009 | Koenemann | G01R 31/31703 714/737 |
| 2012/0179823 | A1* | 7/2012 | Hatasaki | G06F 3/06 709/226 |
| 2013/0258842 | A1* | 10/2013 | Mizutani | H04L 41/0668 370/228 |
| 2014/0068022 | A1* | 3/2014 | Kshirsagar | H04L 41/0806 709/220 |
| 2014/0068032 | A1* | 3/2014 | Kannan | H04L 12/4641 709/221 |
| 2014/0068599 | A1* | 3/2014 | Kannan | G06F 8/61 718/1 |
| 2014/0201735 | A1* | 7/2014 | Kannan | G06F 9/45558 718/1 |

(Continued)

*Primary Examiner* — Mahran Y Abu Roumi
(74) *Attorney, Agent, or Firm* — Jenkins, Wilson, Taylor & Hunt P.A.

(57) ABSTRACT

Methods, systems, and computer readable mediums for monitoring and managing a computing system using resource chains are disclosed. In some examples, a method includes obtaining resource component data from each of a plurality of resource managers in a computing system and organizing the resource component data to establish logical relationships among resource components included in the computing system. The method further includes defining a resource configuration that identifies at least two of the resource components used to facilitate a communication path between a virtual resource in the computing system to a designated network element and displaying the resource configuration as a resource chain that defines a linking order among the at least two of the resource components that facilitate the communication path.

20 Claims, 4 Drawing Sheets

(56) References Cited

U.S. PATENT DOCUMENTS

| | | | |
|---|---|---|---|
| 2014/0317261 A1* | 10/2014 | Shatzkamer | G06F 9/455 |
| | | | 709/223 |
| 2016/0246652 A1* | 8/2016 | Herdrich | G06F 9/5077 |
| 2017/0019303 A1* | 1/2017 | Swamy | H04L 41/5041 |
| 2017/0019335 A1* | 1/2017 | Schultz | H04L 43/0876 |
| 2017/0126792 A1* | 5/2017 | Halpern | H04L 41/0896 |

* cited by examiner

METHODS, SYSTEMS, AND COMPUTER READABLE MEDIUMS FOR MONITORING AND MANAGING A COMPUTING SYSTEM USING RESOURCE CHAINS

TECHNICAL FIELD

This specification relates generally to troubleshooting computing systems. More particularly, the specification relates to monitoring and managing a computing system using resource chains.

BACKGROUND

Computing systems, like converged infrastructure (CI) systems, may include several independent resource components (e.g., physical and/or virtual components) that are often difficult to monitor and troubleshoot on an individual basis without context with respect to other resource components utilized in a system. Notably, a detection of what appears to be an error or failure present in one resource component of a first system may ultimately be revealed as a completely different error in another system. Further, a missing virtual local area network (VLAN) configuration from a virtual host entity might appear as a "join domain" failure for a virtual machine. Similarly, a masking view misconfiguration issue may appear as a virtual host entity losing access to its storage resources. Currently, monitoring and managing configuration issues in a computing system requires both in-depth knowledge of various system environments and a significant amount of time to execute. Notably, the ability to troubleshoot issues occurring in computing systems, such as a CI, may be improved if an underlying computing system's configuration of resource components can be presented in a more structured manner.

SUMMARY

The present specification describes methods, systems, and computer readable mediums for monitoring and managing a computing system using resource chains. In some examples, a method includes obtaining resource component data from each of a plurality of resource managers in a computing system and organizing the resource component data to establish logical relationships among resource components included in the computing system. The method further includes defining a resource configuration that identifies at least two of the resource components used to facilitate a communication path between a virtual resource in the computing system to a designated network element and displaying the resource configuration as a resource chain that defines a linking order among the at least two of the resource components that facilitate the communication path.

BRIEF DESCRIPTION OF THE DRAWINGS

The subject matter described herein will now be explained with reference to the accompanying drawings of which.

DETAILED DESCRIPTION

Figure 1:
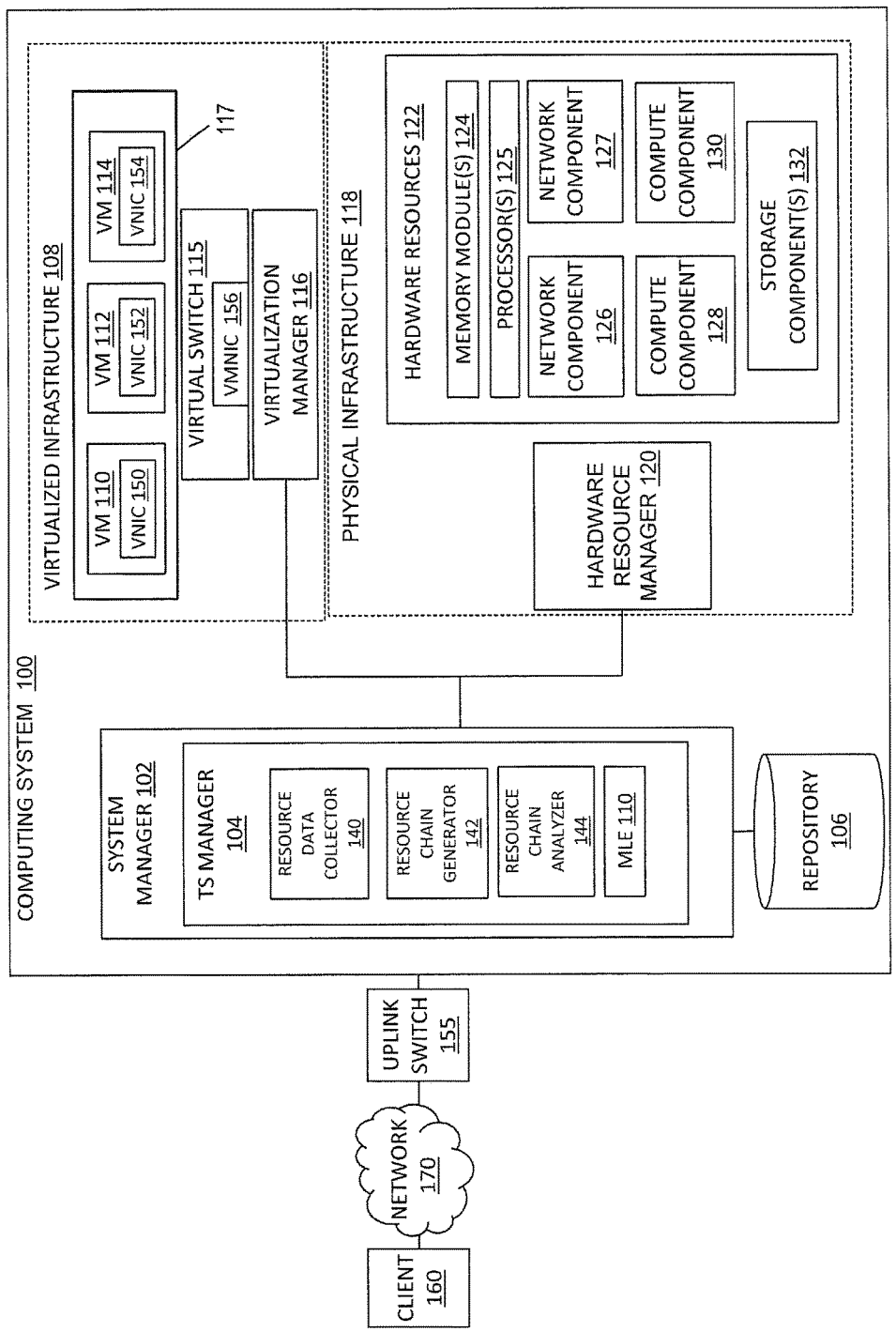
FIG. 1 is a block diagram illustrating a computing system environment according to an embodiment of the subject matter described herein.

The subject matter described herein includes methods, systems, and computer readable mediums for monitoring and managing a computing system using resource chains. As used herein, a resource chain is a visual representation of linked resource components utilized by a particular computing system to establish a communication path. In some embodiments, the resource chain is structured to depict an order in which traffic traverses the resource components via the communication path that includes a point of origin (e.g., an ESXi host entity or virtual machine) to a designated network element (e.g., a customer uplink network switch, aggregation switch, or a logical unit number device (LUN) in a storage area network (SAN)).

In some embodiments, an exemplary computing system for using resource chains to perform monitoring and managing related functions can comprise at least one physical computer system and/or device that utilizes one or more processors and memory, such as an integrated infrastructure (which may include a plurality of compute components, each of which includes one or more processors and memory). One exemplary integrated infrastructure includes a converged infrastructure (CI) system, such as, for example, a Vblock® System from VCE Company, LLC. A CI system can comprise multiple resource components (e.g., physical resource components and/or virtual resource components) in a preconfigured or prepackaged computing platform, where some resource components are developed and/or manufactured by multiple entities. For example, an exemplary CI system can comprise physical resource components such as physical compute devices, physical data storage devices, physical servers, physical networking equipment, and software for managing physical resources and/or virtualized resource components (e.g., virtual servers and/or virtual machines hosted/supported by the physical resource components). Although the following disclosure may describe the use of one or more CI systems in some instances, any computing system or device may be utilized without departing from the scope of the present subject matter.

As previously indicated, the ability to monitor and/or troubleshoot problems that arise in a computing system (such as a CI system) can be improved if the configurations of the underlying computing system resource components could be presented in a more structured manner, such as showing how different resource components are linked together to establish a communication path (e.g., a network path or a storage path). Unfortunately, this information is largely distributed over several independent products or manager entities (e.g., unified computing system (UCS) Manager, ViPR, Vision, Panorama, vCenter, vRealize Automation, etc.) associated with the operation of a particular computing system (e.g., a CI system). Consequently, an administrator is compelled to navigate through a complex set of relationships to determine the root cause of a detected issue. Resource components, however, provide more valuable information when presented along with other resource components that are linked together as compared to when the resource components are presented individually. Accordingly, the present subject matter affords a method for monitoring and managing the changes to resource chains instead of individual resource components for more efficient troubleshooting.

FIG. 1 is a block diagram illustrating an exemplary computing system 100 according to an embodiment of the subject matter described herein. Computing system 100 can comprise resource components, such as virtual resources and physical hardware resources. Exemplary physical hardware resources can comprise a processor, a memory module, a compute component, a network component, a storage component, a server, network equipment, a router, a switch, fabric wiring or cabling, a physical port, and/or a communications interface. Exemplary virtual resources can comprise at least one virtual entity (e.g., an entity that appears as a physical entity but comprises one or more components supported by one or more underlying hardware resources) such as a virtual machine, a virtual server, a virtual switch, a virtual storage device, a virtual port, and/or a virtual communications interface. Computing system 100 may also comprise software and related components for managing the computing system and/or portions (e.g., resource components) therein.

In some embodiments, computing system 100 may be configured to provide data center functionality, cloud service functionality, and/or any other application or computer network service functionality. Computing system 100 may be capable of communicating with other computing systems (e.g., positioned locally or at various physical locations or sites) and may communicate with various other entities, such as network nodes (e.g., servers hosting online sites) and users. In some embodiments, computing system 100 may be connected to an uplink network switch 155 (e.g., an aggregation switch) that is configured to receive connections from a plurality of computing systems (e.g., CI systems) and provide a connection to network 170. Although FIG. 1 depicts a single computing system 100 connected to uplink switch 155, additional computing systems may be communicatively connected to uplink switch 155 without departing from the scope of the present subject matter. Further, a client 160 may represent any mechanism/element (e.g., software executing on a processor, a web-based interface, etc.) for allowing a user entity (e.g., a human operator or an automated system) to interact with computing system 100, resource components therein, and/or other entities. In some embodiments, client 160 may establish communication directly with computing system 100 without using network 170 or uplink network switch 155.

In some embodiments, computing system 100 can comprise a system manager 102 (e.g., a CI system management module), a repository 106, virtualized infrastructure 108, and a physical infrastructure 118. System manager 102 may be any suitable entity for managing and monitoring aspects of computing system 100 or portions therein (e.g., resource components or groups of resource components). System manager 102 may be configured to communicate with various resource components and/or for managing various resource components. In some embodiments, system manager 102 can comprise VCE Vision™ Intelligent Operations software and/or firmware or VCE Panorama™ software or firmware.

As shown in FIG. 1, system manager 102 may include a troubleshooting manager 104 that comprises a resource data collector 140, a resource chain generator 142, a resource chain analyzer 144, and a machine learning engine 110. In some embodiments, resource data collector 104 can be configured to communicate with a plurality of different resource managers (e.g., virtualization manager 116 and hardware resource manager 120) that are responsible for managing resource components (e.g., virtual and physical resources) in computing system 100. For example, resource data collector 140 may be configured to receive, relay, route or forward resource component information requests (e.g., via Ethernet frames or packets) to one or more resource manager entities such as, but not limited to, virtualization manager 116 and hardware resource manager 120. In particular, resource data collector 140 can query virtualization manager 116 for virtual resource component data and can query hardware resource manager 120 for physical resource component data. Although shown as a single entity in FIG. 1, resource data collector 140 may be embodied a plurality of different collector entities without departing from the scope of the disclosed subject matter. For example, resource data collector 140 may logically represent a combination of a virtual resource collector and physical resource collector. Alternatively, resource data collector 140 may comprise at least a ViPR collector, a Vision/Panorama collector, a vRA collector, and the like. Resource data collector 140 may also be configured to store the obtained resource component data (e.g., upon receipt) in repository 106 for further processing by troubleshooting manager 104. In some embodiments, repository 106 can include any data storage unit (e.g., a database or plurality of databases) that can be configured to store resource component information and resource chains. Although FIG. 1 depicts repository 106 as a local data storage unit residing on computing system 100, repository 106 can also be embodied as a data storage unit located at an online location (e.g., a public distributed content site), on a local proxy server in a customer's or system administrator's environment, or on a different computing system without departing from the scope of the disclosed subject matter. Further, repository 106 can be implemented using one or more computing platforms, devices, or systems.

As indicated above, troubleshooting manager 104 includes a resource chain generator 142 that is configured to query repository 106 and access the stored resource component data. Upon accessing the resource component data, resource chain generator 142 may then be configured to organize the resource component data to establish logical relationships among resource components included in the computing system 100. In some embodiments, resource chain generator 142 may establish logical relationships among the resource components by utilizing identifiers or identification tags associated with the resource components that are common and/or correlate with each other. Examples of resource component identifiers or identification tags utilizes by resource chain generator 142 include, but are not limited to, media access control (MAC) addresses, virtual local area network (VLAN) identifiers, port group identifiers, world wide port name (WWPN) address identifiers, virtual storage area network (VSAN) identifiers, VSAN zone identifiers, ESXi identifiers, UCS service profile identifiers, universally unique identifiers (UUIDs), physical blade identifiers, and the like. In some embodiments, resource chain generator 142 may utilize the identifiers to establish relationships between the resource components based on the communication path logically connecting a point of origin in the computing system (e.g., a VM) to a designated network element (e.g., a SAN internal to the computing system or an uplink switch external to the computing system). For example, a VM's MAC address can be designated as a start or point of origin for a communication path to a designated network element "endpoint". Resource chain generator 142 may then use identifiers associated with each of the dependencies (e.g., dependent resource components) included in the communication path that, if configured correctly, enable the VM to communicate with the designated network element (or any other designated customer network resource).

Resource chain generator 142 may be further configured to create resource chains that based on resource configurations. For example, resource chain generator may define a resource configuration that identifies at least two of the resource components used to facilitate a communication path (e.g., a network path or storage path) between a virtual resource in the computing system to a designated network element (e.g., an uplink switch or storage array LUN). Further, resource chain generator 142 is configured to display the resource configuration that defines a linking order among the at least two of the resource components that facilitate the communication path (see below and FIG. 2 for more detail) as a resource chain. In some embodiments, resource chains may be stored by resource generator 142 in a section of repository 106 for subsequent monitoring and analysis by resource chain analyzer 144.

As shown in FIG. 1, troubleshooting manager 104 further includes a resource chain analyzer 144. In some embodiments, resource chain analyzer 144 is configured to monitor established resource chains (instead of individual resource components) to detect changes or failures in resource components and connection paths. In some embodiments, troubleshooting manager 104 may utilize a machine learning engine 110 (e.g., one or more machine learning tools) to help detect failures and/or predict configuration issues without manual intervention once the resource chains are identified.

In some embodiments, virtualized infrastructure 108 can be associated with one or more virtual entities. Each virtual entity can be composed of one or more resource components or portions therein, e.g., physical resource components from the computing system. Virtualized infrastructure 108 can comprise a virtualization environment configured to simulate components of a computing device, e.g., a processor, system memory, and a storage device, for executing one or more virtual machines (VMs) (e.g., VM 110, VM 112, and VM 114). Each of VM 110, VM 112, and VM 114 may be configured to perform various functions and/or services, such as web server functions or cloud application services, and may interact with various nodes, components, and/or users. In FIG. 1, VMs 110-114 respectively include virtual network interface cards (VNICs) 150-154 that are configured to establish a communication connection with virtual switch 115. Each VM and VNIC may be mapped to a MAC address that is discoverable by virtualization manager 116. Virtual switch 115 may include port groups that are utilized to establish connections with VMs 110-114 via VNICs 150-154. Notably, each the port groups of virtual switch 115 are identified by a port group identifier and/or a VLAN identifier known by virtualization manager 116. Further, virtual switch 115 may be assigned a MAC address that is discoverable by virtualization manager 116. Virtual switch 115 may be mapped to one or more VM network interface cards (VMNICs), such as VMNIC 156, which may comprise a physical network adapter utilized by virtual switch 115 to connect to the uplink port on a physical switch (e.g., network component 126 or 127) in the computing system 100. Similarly, VMNIC 156 has a MAC address that is discoverable by virtualization manager 116 and/or hardware resource manager 120.

In some embodiments, virtualization manager 116 may allow logical entities to be created, deleted, or modified using an application programming interface (API) and/or a graphical user interface (GUI). Virtualization manager 116 may be any suitable entity (e.g., software executing in a virtual machine) for managing aspects associated with virtualized infrastructure 108. In some embodiments, virtualization manager 116 may be configured to provide resource component data (e.g., virtual machine identification data, virtual switch identification data, VNIC data, and VMNIC data including, but not limited to MAC addresses, VLAN identifiers, port group identifiers, WWPN address identifiers, VSAN identifiers, VSAN zone identifiers, ESXi identifiers, UCS service profile identifiers, UUIDs, physical blade identifiers, and the like) to resource data collector 140 upon request (e.g., via use of APIs).

In some embodiments, virtualized infrastructure 108 can include a hypervisor 117 that may be configured to function as a host operating system that manages and/or runs one or more guest applications (e.g., operating systems). As used herein, the term "hypervisor" can refer to computer software and/or firmware supported by underlying hardware that is responsible for creating, hosting and managing guest virtual machines running on a host machine (e.g., ESXi host server). Notably, each guest operating system can function within the hypervisor as a virtual machine and provide a platform for executing various application workload services and/or enterprise applications. In some embodiments, compute components 128-130 can be configured as the underlying hardware responsible for implementing virtual machines 110-114, which in turn can be configured to host virtual entities including a virtual machine, a virtual server, a virtual storage device, a virtual port, and/or a virtual communications interface.

Physical infrastructure 118 can comprise hardware resource components 122, such as memory module(s) 124, processor(s) 125, network components 126-127, compute components 128-130, and one or more storage component(s) 132. Hardware resource components 122 may be communicatively connected to various other resource components in computing system 100 and other entities. Hardware resources 122 can be configured for use by one or more virtual entities. In some embodiments, network components 126-127 (e.g., network switches) may be configured to enable communication between the resource components in computing system 100. Network components 126-127 also enable communication with components outside of computing system 100 (e.g., via uplink switch 155 and network 170).

Hardware resource manager 120 can be any suitable entity (e.g., software executing in a virtual machine) for managing aspects associated with physical infrastructure 118. In some embodiments, hardware resource manager 120 may be configured to monitor hardware resource components 122 via one or more communications interfaces. For example, hardware resource manager 120 may provision hardware resource components 122 for implementing one or more virtual entities in virtualized infrastructure 108. In some embodiments, hardware resource manager 120 may comprise any management component or entity, such as a unified infrastructure manager (UIM) or a unified computing system (UCS) director entity, which is configured to manage and monitor the physical hardware resource components of computing system 100.

In some embodiments, processor(s) 125 can include a microprocessor (e.g., a trusted platform module (TPM) using trusted execution technology (TXT)), central processing unit (CPU), or any other like hardware based processing unit. In some embodiments, elements 104, 110, and 140-144 of the disclosed subject matter can be stored in memory module(s) 124, which can include random access memory (RAM), read only memory (ROM), optical read/write memory, cache memory, magnetic read/write memory, flash memory, or any other non-transitory computer readable medium. In some embodiments, processor(s) 125 and memory module(s) 124 can be used to execute, implement, and/or manage the operation of aspects of the disclosed subject matter. In some embodiments, storage component(s) 132 can include any storage medium or storage unit (e.g., one or more LUN devices of a storage area network) that is configured to store data accessible by processor(s) 125 via a system bus.

As indicated above, the disclosed subject matter is configured to collect resource component information from a plurality of resource managers. Initially, virtualization manager 116 may be configured to communicate with hypervisor 117. In some embodiments, hypervisor 117 includes a vCenter server or vSphere ESXi server produced by VMware. Upon establishing the connection, virtualization manager 116 may obtain a list of supported VMs from hypervisor 117. Further, virtualization manager 116 may obtain data that identifies the virtual network interface cards (VNICs) for each of virtual machines 110-114. Accordingly, virtualization manager 116 may determine a total count of the VNICs in virtualized infrastructure 108. In some embodiments, virtualization manager 116 may discover and/or obtain the MAC addresses for each of VMs and the VNICs. Virtualization manager 116 may further be configured to collect identifier information pertaining to the virtual port groups on virtual switch 115 where each of the VNICs are communicatively connected (e.g., acquiring port group identifier(s) and/or VLAN identifier(s) of the virtual port groups). The resource component data may also include MAC addresses of the virtual switch uplink NICs (VMNICs) that are used to establish a connection with virtual switch 115. Similarly, virtualization manager 116 may be configured to obtain a MAC address of virtual switch 115. Moreover, virtualization manager 116 may be configured to provide the virtual resource component information (e.g., MAC addresses, VLAN identifiers, port group identifiers, WWPN address identifiers, VSAN identifiers, VSAN zone identifiers, ESXi identifiers, UCS service profile identifiers, UUIDs, physical blade identifiers, etc.) to resource data collector 140 upon request.

In some embodiments, troubleshooting manager 104 receives resource component information from each compute component (e.g., compute components 128-130) regarding its respective compute fabric and supported virtual components. For example, the resource component information may indicate whether a compute component supports the VLAN utilized by virtual switch 115. In some embodiments, troubleshooting manager 104 may use the resource component data to determine whether a VLAN utilized by virtual switch 115 is supported by a compute component based on the VLAN identifier being found to be in the fabric of the compute component.

Similarly, the resource component information may provide data indicative of whether the one or more virtual machines (e.g., one or more of VMs 110-114) are supported by the compute component. In some embodiments, troubleshooting manager 104 may determine whether a virtual machine is supported by a compute component based on the MAC address of the VM being visible or detected in the fabric of the compute component.

In some embodiments, troubleshooting manager 104 receives resource component information from each network component (e.g., network components 126-127) regarding its respective network fabric and supported virtual resource components. For example, the resource component information may provide data that indicates whether the network component is supporting the VLAN utilized by the supported virtual switch 115. In some embodiments, troubleshooting manager 104 may determine whether a VLAN utilized by virtual switch 115 is supported by a network component based on whether the VLAN identifier is found in the fabric of the network component.

Likewise, the resource component information may provide data indicative of whether the one or more virtual machines (e.g., one or more of VMs 110-114) are supported by the network component. In some embodiments, troubleshooting manager 104 may determine whether a virtual machine is supported by a network component based on the MAC address of the VM being visible or detected in the fabric of the network component.

After the resource component data is collected from the resource managers and stored in repository 106 by resource data collector 140, troubleshooting manager 104 may be configured to establish logical relationships among the various resource components. In some embodiments, virtualization manager 116 may be configured to assess the virtual resource components in virtualized infrastructure 108 and provides the associated resource component data to resource data collector(s) 140, which subsequently stores the data in repository 106. Notably, the resource component data may include resource components mapped to identifiers, which can ultimately be utilized to establish logical relationships. For example, the resource component data may include MAC addresses, VLAN identifiers, port group identifiers, WWPN address identifiers, VSAN identifiers, VSAN zone identifiers, ESXi identifiers, UCS service profile identifiers, UUIDs, physical blade identifiers, etc. mapped to the particular virtual resource components.

Similarly, hardware resource manager 120 may be configured to access the underlying physical resource components in physical infrastructure 118 and provides the associated resource component data to resource data collector(s) 140, which subsequently stores the data in repository 106. The physical resource component data associated with the compute components, storage components, and network components are mapped to identifiers (e.g., MAC addresses, VLAN identifiers, port group identifiers, WWPN address identifiers, VSAN identifiers, VSAN zone identifiers, ESXi identifiers, UCS service profile identifiers, UUIDs, physical blade identifiers, etc.). This resource component data stored in repository 106 and used by resource chain generator 142 to establish relationships among the physical resource components.

Figure 2:
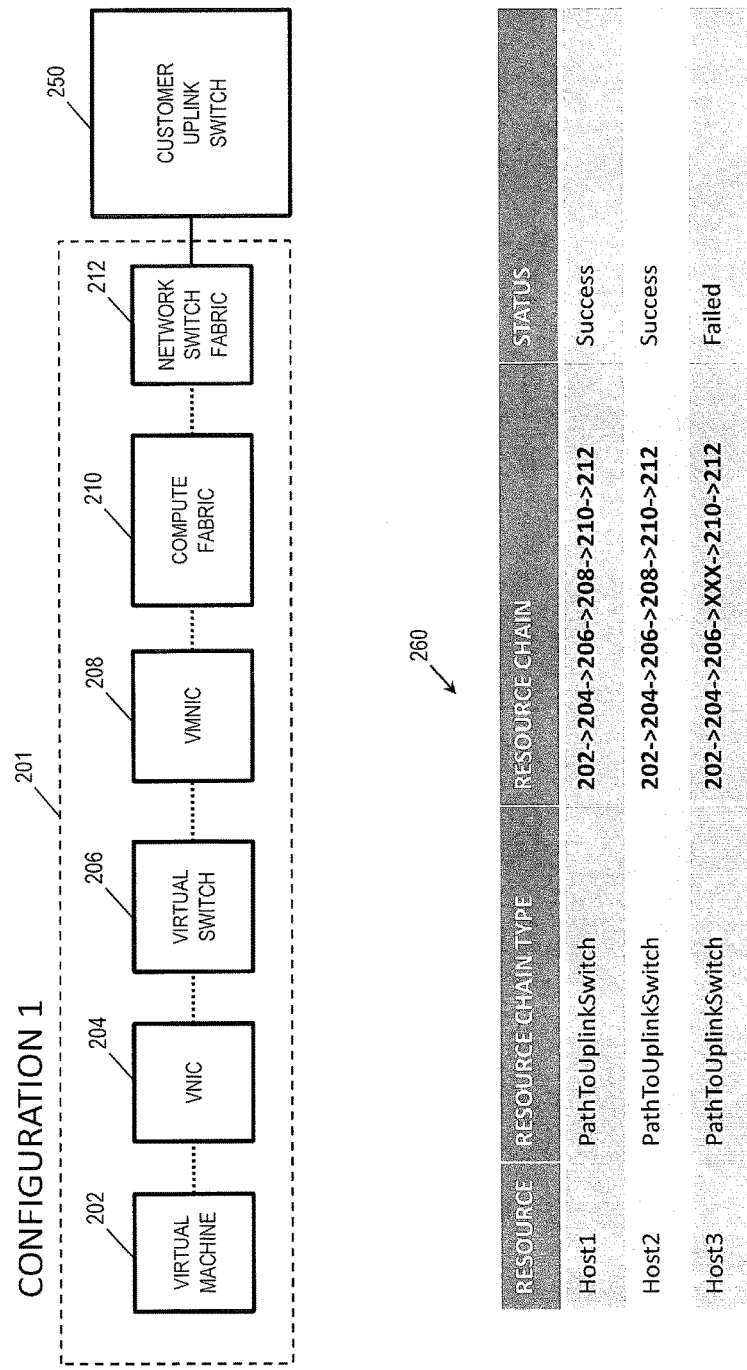
FIG. 2 is a diagram illustrating a communication path and associated resource chain according to an embodiment of the subject matter described herein.
Figure 3:
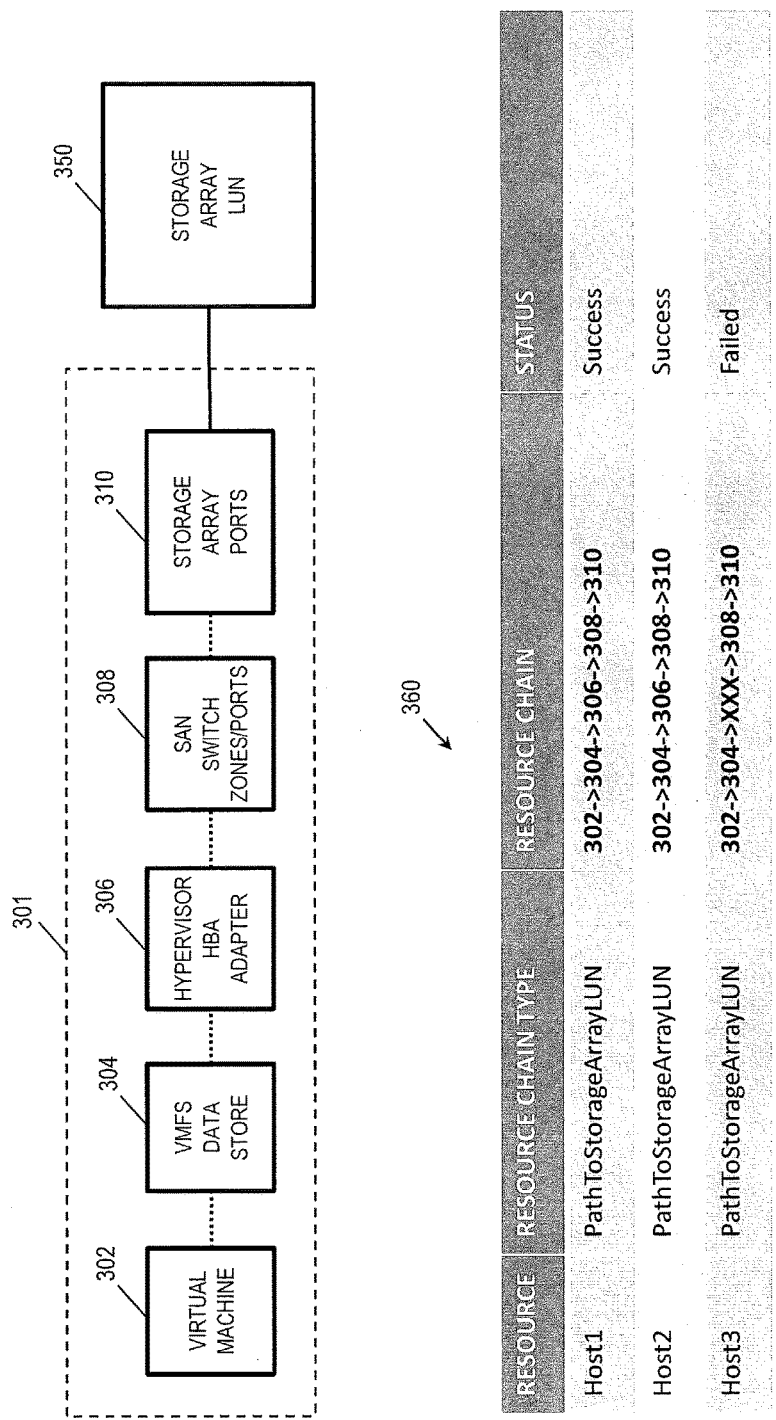
FIG. 3 is a diagram illustrating a second communication path and associated resource chain according to an embodiment of the subject matter described herein.

Once the logical relationships among all of the resource components is established by troubleshooting manager 104 (and/or resource chain generator 142), troubleshooting manager 104 may be configured to define a resource configuration that identifies resource components used to facilitate a communication path between a virtual resource in the computing system to a designated network element. For example, a resource configuration may be defined with respect to a communication path between a virtual host server and a designated network element, such as a customer uplink network switch or LUN device of a storage array. Notably, troubleshooting manager 104 (and/or resource chain generator 142) may be configured to establish the communication path by using the resource component identifiers as links between the resource components. Resource chain generator 104 may then utilize the resource configuration to generate a resource chain. For example, the resource configuration may be displayed (e.g., to a user on a display screen) as a resource chain that defines a linking order among the resource components that facilitate the communication path. FIGS. 2 and 3 provide additional detail regarding the resource chains.

Once the resource chains are established, troubleshooting manager 104 and/or resource chain analyzer 144 may be configured to manage and monitor the status of the communication paths via inspection of the resource chains. In some embodiments, resource chain analyzer 144 is configured to monitor the generated resource chains (e.g., via resource chain tables depicted in FIGS. 2 and 3) to determine if a configuration problem arises with respect to a communication path. For example, resource chain analyzer 144 may be configured to inspect the resource chain columns of the resource chain tables (e.g., tables 260 and 260 in FIGS. 2 and 3) maintained by the computing system. In some embodiments, resource chain analyzer 144 may compare the entries of resource chains in order to detect differences that are indicative of failure. By comparing the resource chain associated with one host entity with respect to a resource chain associated with a second host entity, resource chain analyzer 144 (e.g., using machine learning engine or tools) may be able to detect broken links. Notably, host entities belonging to a common cluster should have the same configuration such that the hosted VMs may be transferred between the host entities for instances of failures or migrations. After a difference between resource chains is detected by resource chain analyzer 144 (e.g., a host with a resource chain that varies from the other resource chains), resource chain analyzer 144 may indicate the failure with a "Failed" tag in the status column of the resource chain table (e.g., see last column and last line in table 260 in FIG. 2). Accordingly, a user may be permitted to promptly inspect the status columns of the resource chain tables (e.g., tables 260 and 260 in FIGS. 2 and 3) maintained by the computing system and identify the resource chains that are unsuccessful as well as the failed resource component in the identified resource chain. In some embodiments, a machine learning engine 110 may be configured to monitor the status columns of the resource chain tables to detect a failed resource chain status. In effect, machine learning engine 110 may be configured to process and correlate the data obtained from all of the resource components in the computing system in order to identify resource component inter-dependencies (e.g., relationships) between each resource component and at least one other resource component.

As indicated above, the subject matter disclosed herein can be implemented in software in combination with hardware and/or firmware. For example, subject matter described herein can be implemented in software executed by a processor. In another example, subject matter described herein may be implemented as a firmware extension and/or a BIOS extension. In some exemplary implementations, the subject matter described herein can be implemented using a computer readable medium having stored thereon computer executable instructions, which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. For example, troubleshooting manager 104 and/or repository 106 (e.g., a system library or data therein) may be located at a single computing system or may be distributed across one or more devices, platforms, and/or systems. As used in the disclosed subject matter, the terms "function" or "module" refer to hardware, firmware, or software in combination with hardware and/or firmware for implementing features described herein.

It will be appreciated that FIG. 1 is for illustrative purposes and that various components, their locations, and/or their functions as described above in relation to FIG. 1 can be changed, altered, added, or removed. Further, aspects of the disclosed subject matter (e.g., cluster manager 110) can be implemented and/or located on any computing system or components therein.

FIG. 2 is a diagram illustrating a resource configuration and associated resource chain according to an embodiment of the subject matter described herein. In particular, FIG. 2 depicts an example resource configuration 201 representing a communication path between a virtual machine hosted on a virtual host entity (e.g., an ESXi host server) and a customer uplink switch (e.g., an aggregation switch). FIG. 2 also depicts an associated resource chain table 260 (or at least a portion of a resource chain table) that displays resource chain information pertaining to each of a plurality of virtual host entities (e.g., ESXi host servers). Configuration 201 depicts a communication path that includes a virtual machine 202 that is connected to VNIC 204, which in turn shares a connection to a virtual switch 206 (via port groups) in a computing system. Configuration 201 further includes virtual switch 206 sharing a link to VMNIC 208 (e.g., hypervisor network adapters), which facilitates a connection to network switch fabric 212 (e.g., network components) via compute component fabric 210 (e.g., compute components). Based on these relationship established by troubleshooting manager 104 and/or resource chain generator 142, resource chain generator 142 is able to generate at least one resource chain entry in resource chain table 260. As shown in FIG. 2, resource chain table 260 includes a plurality of data entries corresponding to different host entities (e.g., ESXi host servers). Namely, the first column of table 260 contains resource name information (e.g., "HOST1", "HOST2", "HOST3", etc.) and the second column of table 260 includes a resource chain type. In FIG. 2, each entry in table 260 includes a resource chain "type" of "PathtoUplinkSwitch". Notably, the entries of table 260 depict communication paths (e.g., network paths) from the host entities to a particular (i.e., the same) uplink network switch (e.g., customer uplink switch 250). The third column of table 260 details the resource chains associated with the communication path 201. For example, the first entry of table 260 includes a resource chain comprising identifiers 202→204→206→208→210→212, which respectfully represent the resource components illustrated in resource configuration 201. It is worth noting that the second table entry has an identical resource chain with respect to the resource chain represented in the first entry of table 260. This representation is intended to indicate that the two resource chains include the same type of resource components in the respective resource chains (and not necessarily the exact same or common resource components themselves). As indicated above, resource chain analyzer 144 may be configured (e.g., via machine learning engine 110) to detect errors and failures with respect to the underlying resource components utilizing a resource chain. Notably, resource chain analyzer 144 is able to detect a broken link in the resource chain by comparing a number of resource chain entries in resource chain table 260. In particular, resource chain analyzer 144 is able to detect an error or failure by identifying a difference in the link orders specified by each of two or more resource chains in table 260. For example, failures may be detected in the computing system by comparing the resource chain with a second resource chain that defines a linking order of resource components that facilitate a second communication path to the designated network element.

It will be appreciated that FIG. 2 is for illustrative purposes and that additional and/or different machine-learning tasks than those depicted in FIG. 2 can be usable for machine-learning and/or related techniques.

FIG. 3 is a diagram illustrating a second communication path and associated resource chain according to an embodiment of the subject matter described herein. FIG. 3 depicts an example resource configuration 301 and associated resource chain table 360 (or at least a portion of a resource chain table) that displays resource chain information pertaining to each of a plurality of virtual host entities (e.g., ESXi host servers). Configuration 301 depicts a communication path that includes a virtual machine 302 that is logically connected to a virtual machine file system (VFMS) data store 204, which in turn is logically connected to a hypervisor host bus adapter (HBA) 306 (via port groups) in the computing system. Configuration 301 further includes a logical connection between hypervisor HBA 306 linked to storage area network (SAN) switch 308 (e.g., via zones and/or port groups), which facilitates a connection to storage array ports 310. Based on this relationship established by manager 104, resource chain generator 142 is able to generate a resource chain entry in resource chain table 360, As shown in FIG. 3, resource chain table 360 includes a plurality of data entries corresponding to different host entities (e.g., ESXi host servers). Namely, the first column of table 360 contains resource name information (e.g., "HOST1", "HOST2", "HOST3", etc.) and the second column of table 360 includes a resource chain type. In FIG. 3, each entry in table 360 includes a resource chain type of "PathtoStorageArrayLUN". Notably, the entries of table 360 depict communication paths from the host entities to a common storage array LUN (e.g., storage array LUN 350). The third column of table 360 details the resource chains associated with the communication path 301. For example, the first entry of table 260 includes a resource chain 302→304→306→308→310 that signifies the resource components described in configuration 301. It is worth noting that the second table entry has an identical resource chain with respect to the resource chain represented in the first entry of table 360. This representation is intended to indicate that the two resource chains include the same type of resource components in the respective resource chains (and not necessarily the exact same or common resource components themselves). Further, as indicated above with respect to FIG. 2, resource chain analyzer 144 is able to detect an error or failure by identifying a difference in the link orders specified by each of two or more resource chains in table 360.

It will be appreciated that FIG. 3 is for illustrative purposes and that additional and/or different machine-learning tasks than those depicted in FIG. 3 can be usable for machine-learning and/or related techniques.

Figure 4:
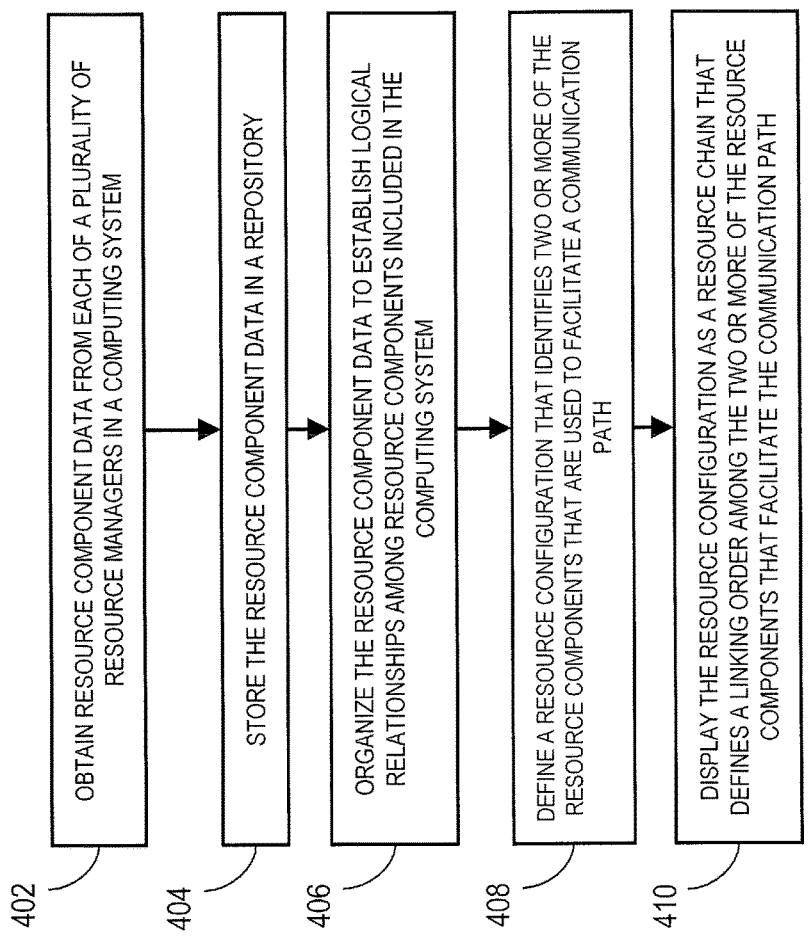
FIG. 4 is a diagram illustrating a method for monitoring and managing a computing system using resource chains according to an embodiment of the subject matter described herein.

FIG. 4 is a diagram illustrating a method 400 for monitoring and managing a computing system using resource chains according to an embodiment of the subject matter described herein. In some embodiments, method 400 can include actions or operations performed by computing system 100, system manager 102, troubleshooting manager 104, and/or other module(s) or node(s) (e.g., one or more servers or computers containing one or more processors and memory). For example, resource data collector 140, resource chain generator 142 and resource chain analyzer 144, and machine-learning engine 110 may be stored in memory and implemented using at least one physical computer to perform method 500 or portions therein. For illustrative purposes and explanation, references to entities included in FIGS. 1-4 may be used below.

Referring to method 400, in step 402, resource component data is obtained from each of a plurality of resource managers in a computing system. In some embodiments, various resource managers in the computing system are able identify different resource components residing within the computing system. For example, resource data collector 140 may be configured to query a hardware resource manager 120 to obtain identification information and status data related to all of the hardware resource components (and their respective firmware/software versions) provisioned in the computing system. Hardware resource manager 120 may have access to and provide information pertaining to SAN network and zoning, storage volumes, computing system model information (e.g., CI model information), storage ports, and the like. Similarly, resource data collector 140 may query virtualization manager 116 to obtain identification information and status data related to all of the virtual resource components (e.g., virtual machines 110-114, virtual switch 115, etc.) existing in the virtual layer (e.g., virtualized infrastructure 108). Virtualization manager 116 may have access and provide information pertaining to virtual data stores, virtual clusters, virtual machines, virtual switches, virtual network adapters, hypervisor servers, and the like. In some embodiments, resource data collector 140 may be embodied as a plurality of specialized collectors (e.g., a ViPR collector, a Vision/Panorama collector, a UCS manager collector, and/or a vRA collector) that are respectively linked to specialized resource manager collectors (e.g., a ViPR manager, Vision/Panorama manager, a UCS manager, and/or a vRA manager).

In bock 404, the resource component data is stored in a repository. In some embodiments, upon obtaining this resource component information, resource data collector 140 may be configured to forward the collected data to repository 106 for storage and use.

In block 406, the resource component data is organized to establish logical relationships among resource components included in the computing system. In some embodiments, resource chain generator 114 may be configured to access repository 106 and analyze the resource component data stored within. Using the resource component data, resource chain generator 142 may discover logical relationships existing between the resource components. For example, resource chain generator 142 may be configured to discover/establish logical relationships by determining the resource component dependencies in the network communication path all the way up to the customer network for any given VM. In the event a VM has multiple communication paths (e.g., high availability), then each communication path will be identified and mapped by resource chain generator 142. In some embodiments, resource generator 142 is also further configured to utilize VLAN identifiers, port group identifiers, and MAC addresses to establish the logical relationships. Based on the discovered relationships existing among the resource components, resource chain generator 142 may be configured to tag the resource components with a resource identifier.

In block 408, a resource configuration that identifies at least two of the resource components used to facilitate a communication path is defined. In some embodiments, resource chain generator 142 is configured to utilize the data that identifies the established logical relationship among the resource components to determine the resource components needed to establish a communication path existing within the computing system. For example, resource chain generator 142 may be configured to define a communication path from a host in the computing system to an uplink network switch communicatively connected to the computing system itself (e.g., an aggregation switch connected to a CI). Notably, resource chain generator 142 is able to identify the individual resource components in the computing system that are used to establish the communication path between the virtual host entity to the uplink network switch. For example, the origin of the communication path may be the virtual host's i) virtual machine and may logically traverse through a ii) virtual switch and iii) hypervisor network adapters. From that point, the communication path may continue to a iv) compute component fabric and v) a network component fabric. Using FIG. 1 as an example, a resource configuration of a communication path may include i) virtual machine 110, ii) virtual switch 115, iii) a hypervisor 117, iv) compute component 128, and v) network component 126, which may be communicatively connected to the uplink network switch 150.

In block 410, the resource configuration is displayed as a resource chain that defines a linking order among the at least two of the resource components that facilitate the communication path. In some embodiments, resource chain generator 142 utilizes the resource configuration to construct a resource chain for the host. In particular, resource chain generator 142 may record the resource chain, which is representative of the communication path, in a resource chain table. For example, an entry in the resource chain table may include a resource chain that represents the communication path from a virtual host to a designated aggregation switch (e.g., uplink network switch). Notably, the resource chain can be represented as VM→VS→hypervisor→compute component→network component.

It will be appreciated that FIG. 4 is for illustrative purposes and that additional and/or different steps than those depicted in FIG. 4 can be usable for monitoring and managing a computing system using resource chains. Additionally, it will be appreciated that steps depicted in FIG. 4 can occur in a different order or may be performed concurrently.

It should be noted that computing system 100, system manager 102, troubleshooting manager 104, and/or functionality described herein can constitute a special purpose computing system. Further, computing system 100, system manager 102, troubleshooting manager 104, and/or functionality described herein can improve the technological field of distributed computer systems by using one or more machine-learning algorithms to manage and monitor a host computer system using resource chains. By using resource chains to detect configuration errors of resource components of a computing system, functionalities such as workload management, VM configuration, and/or other monitoring and management related tasks may be performed more quickly and more efficiently.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
obtaining resource component data from each of a plurality of resource managers in a computing system;
organizing the resource component data to establish logical relationships among resource components included in the computing system;
defining a resource configuration that identifies at least two of the resource components used to facilitate a communication path between a virtual resource in the computing system to a designated network element;
displaying the resource configuration as a resource chain entry in a resource chain table that defines a linking order among the at least two of the resource components that facilitate the communication path within a first virtual resource host; and
detecting a failure in the communication path by comparing the resource chain entry and at least one other resource chain entry corresponding to a second virtual resource host in the resource chain table, wherein detecting a failure in the communication path further includes detecting a difference between a first linking order defined in the resource chain entry and a second linking order defined in the at least one other resource chain entry in the resource chain table.

2. The method of claim 1 wherein the designated network element includes at least one member from a group consisting of a uplink network switch and a logical unit number (LUN) device in a storage area network (SAN).

3. The method of claim 1 wherein the at least one other resource chain entry defines a linking order of resource components that facilitate a second communication path to the designated network element.

4. The method of claim 3 wherein detecting failures in the computing system is performed utilizing one or more machine-learning tools.

5. The method of claim 1 wherein organizing the resource component data includes utilizing one or more identifiers associated with each of the resource components to establish the logical relationships.

6. The method of claim 1 wherein obtaining the resource component data includes storing the resource component data in a repository that is accessible by a troubleshooting manager in the computing system.

7. The method of claim 1 wherein the virtual resource includes a virtual machine (VM) in the computing system.

8. A system comprising:
at least one processor;
memory; and
a troubleshooting manager that is stored in the memory and when executed by the at least one processor executes operations comprising:
obtaining resource component data from each of a plurality of resource managers in a computing system;
organizing the resource component data to establish logical relationships among resource components included in the computing system;
defining a resource configuration that identifies at least two of the resource components used to facilitate a communication path between a virtual resource in the computing system to a designated network element;

displaying the resource configuration as a resource chain entry in a resource chain table that defines a linking order among the at least two of the resource components that facilitate the communication path within a first virtual resource host; and detecting a failure in the communication path by comparing the resource chain entry and at least one other resource chain entry corresponding to a second virtual resource host in the resource chain table, wherein detecting a failure in the communication path further includes detecting a difference between a first linking order defined in the resource chain entry and a second linking order defined in the at least one other resource chain entry in the resource chain table.

9. The system of claim 8 wherein the designated network element includes at least one member from a group consisting of a uplink network switch and a logical unit number (LUN) device in a storage area network (SAN).

10. The system of claim 8 wherein the at least one other resource chain entry defines a linking order of resource components that facilitate a second communication path to the designated network element to detect failures in the computing system.

11. The system of claim 10 wherein the troubleshooting manager is further configured to utilize one or more machine-learning tools to detect the failures in the computing system.

12. The system of claim 8 wherein the troubleshooting manager is further configured to utilize one or more identifiers associated with each of the resource components to establish the logical relationships.

13. The system of claim 8 wherein the troubleshooting manager is further configured to store the resource component data in a repository that is accessible by the troubleshooting manager in the computing system.

14. The system of claim 8 wherein the virtual resource includes a virtual machine (VM) in the computing system.

15. A non-transitory computer readable medium having stored thereon executable instructions which, when executed by at least one physical computer, cause the at least one physical computer to perform operations comprising:

obtaining resource component data from each of a plurality of resource managers in a computing system;

organizing the resource component data to establish logical relationships among resource components included in the computing system;

defining a resource configuration that identifies at least two of the resource components used to facilitate a communication path between a virtual resource in the computing system to a designated network element;

displaying the resource configuration as a resource chain entry in a resource chain table that defines a linking order among the at least two of the resource components that facilitate the communication path within a first virtual resource host; and detecting a failure in the communication path by comparing the resource chain entry and at least one other resource chain entry corresponding to a second virtual resource host in the resource chain table, wherein detecting a failure in the communication path further includes detecting a difference between a first linking order defined in the resource chain entry and a second linking order defined in the at least one other resource chain entry in the resource chain table.

16. The computer readable medium of claim 15 wherein the designated network element includes at least one member from a group consisting of a uplink network switch and a logical unit number (LUN) device in a storage area network (SAN).

17. The computer readable medium of claim 15 wherein the at least one other resource chain entry defines a linking order of resource components that facilitate a second communication path to the designated network element.

18. The computer readable medium of claim 17 wherein detecting failures in the computing system is performed utilizing one or more machine-learning tools.

19. The computer readable medium of claim 15 wherein organizing the resource component data includes utilizing one or more identifiers associated with each of the resource components to establish the logical relationships.

20. The computer readable medium of claim 15 wherein obtaining the resource component data includes storing the resource component data in a repository that is accessible by a troubleshooting manager in the computing system.

* * * * *